United States Patent [19]
Lawther et al.

[11] Patent Number: 5,477,295
[45] Date of Patent: Dec. 19, 1995

[54] FILM CARTRIDGE LOADING AND EJECTING APPARATUS FOR CAMERA

[75] Inventors: Joel S. Lawther, Rochester; Donald P. McGinn, Palmyra, both of N.Y.

[73] Assignee: Eastman Kodak Company, Rochester, N.Y.

[21] Appl. No.: 204,723

[22] Filed: Mar. 1, 1994

[51] Int. Cl.[6] .......................... G03B 19/10; G03B 17/26
[52] U.S. Cl. .......................................... 354/174; 354/275
[58] Field of Search .................................. 354/275, 288, 354/174

[56] References Cited

U.S. PATENT DOCUMENTS

| | | | |
|---|---|---|---|
| 3,543,664 | 12/1970 | Kremp et al. | 95/31 |
| 3,672,279 | 6/1972 | Hackenberg et al. | 95/31 R |
| 4,095,249 | 6/1978 | Miura | 354/288 |
| 4,330,190 | 5/1982 | Chan | 354/275 |
| 5,049,914 | 9/1991 | Dassero | 354/288 |
| 5,142,316 | 8/1992 | Tanii et al. | 354/212 |
| 5,155,514 | 10/1992 | Tanamura et al. | 354/174 |
| 5,159,365 | 10/1992 | Takahashi et al. | 354/21 |
| 5,323,201 | 6/1994 | Richiuso et al. | 354/288 |

FOREIGN PATENT DOCUMENTS

| | | |
|---|---|---|
| 3113578 | 10/1982 | Germany . |
| 3200133 | 9/1991 | Japan . |
| 5158144 | 6/1993 | Japan . |
| 5150345 | 6/1993 | Japan . |

*Primary Examiner*—Michael L. Gellner
*Assistant Examiner*—Nicholas J. Tuccillo
*Attorney, Agent, or Firm*—David A. Howley

[57] ABSTRACT

A camera having a loading chamber for receiving an elongated film cartridge of the type having an engagement notch formed in the cartridge shell and having a combined insertion and ejection mechanism for engaging the engagement notch for positively pulling the film cartridge in and seating it with an audible "click" sound to reassure the user that the film cartridge is loaded properly in the loading chamber. A bell crank is attached for pivotal movement with respect to the film cartridge loading chamber and has spaced apart, insertion and ejection crank legs and rods that extend into the loading chamber to engage the inserted end and the notch of the cartridge, respectively, at different points during the insertion and ejection of the cartridge. An over center spring is attached to the bell crank to urge it into and resist movement from either the insertion or seated positions. During cartridge loading, the inserted end of the cartridge bears against the ejection crank rod and pivots the bell crank to an over center position where the insertion crank rod enters the notch. Upon passing the insertion over center position, the over center spring provides insertion force through the insertion crank leg and rod on the notch, thereby pulling the cartridge into the seated position. A loading chamber door actuated ejector comprises a lever and spring biased lifter which are actuated on opening the door through a predetermined angle and partially eject the film cartridge. . The partial ejection pivots the bell crank toward the insertion position and past an ejection over center position, where the insertion crank leg and rod is released from the notch. The ejection crank leg and rod propels the cartridge out of the loading chamber as the over center spring urges the bell crank back into the insertion position to receive the next cartridge to be loaded.

13 Claims, 10 Drawing Sheets

FILM CARTRIDGE LOADING AND EJECTING APPARATUS FOR CAMERA

CROSS-REFERENCE TO RELATED APPLICATIONS

Reference is made to commonly assigned, patent application Ser. No. 08/075,969, now U.S. Pat. No. 5,430,515, filed Jun. 11, 1993, by Lawther et al., entitled APPARATUS FOR CONTROLLING THE MOVEMENT OF A FILM CARTRIDGE FROM A LOADING CHAMBER IN A CAMERA and to commonly assigned, patent application Ser. No. 08/072,619, now U.S. Pat. No. 5,323,201, filed Jun. 4, 1993, by Richiuso et al., entitled CASSETTE EJECTING APPARATUS, and to commonly assigned, patent application Ser. No. 08/205,001 filed on even date herewith by Lawther et al., entitled FILM CARTRIDGE LOADING APPARATUS FOR CAMERA.

FIELD OF THE INVENTION

The present invention relates generally to the field of photography, and more particularly, to an improved film cartridge handling mechanism for effecting end-wise loading and ejection of a film cartridge into and from a loading chamber of a camera.

BACKGROUND OF THE INVENTION

In conventional cameras, 35 mm film cartridges or cassettes are loaded from the side through a hinged camera back into a loading chamber on one side of the image frame exposure gate, and the filmstrip is either manually or automatically directed through the exposure gate and wound on a take-up reel. After all image frames are exposed, the filmstrip is either automatically rewound by a motorized drive or manually rewound into the cartridge. The cartridge is then typically removed by opening the hinged camera back, releasing the drive from the cartridge spool hub and manually withdrawing the cartridge from the loading chamber.

More recently, it has been proposed to load and eject conventional and modified 35 mm cartridges in an end-wise fashion through a sliding or pivoted door in the bottom or side of the camera body and to employ motorized filmstrip winding and rewinding apparatus to advance the filmstrip out of and back into the cartridge. Such cameras are disclosed, for example, in commonly assigned U.S. Pat. No. 5,049,914 and in U.S. Pat. Nos. 5,155,514, 5,159,365 and 5,142,316. In the '914 patent, a camera loading chamber and mechanism is provided for receiving and ejecting a "thrust" style 35 mm cartridge which does not have a protruding film leader and has an actuable cartridge door through which the filmstrip is ejected and rewound. The cartridge is received in the loading chamber and ejected partially from the loading chamber when the door is opened by an ejecting pin linked to the door.

Moreover, an improved loading chamber ejection mechanism for such a thrust cartridge is set forth in the above-referenced co-pending '619 application. The ejection mechanism operates in conjunction with a door supported first for translational movement part way from the loading chamber and then for pivotal movement further from the chamber such that the film cartridge or cassette is also moved translationally during both door movements.

A further thrust style, film cartridge, having a retention slot extending longitudinally along its outer surface for engagement by a retention member during movement of the film cartridge from a camera loading chamber, has been proposed in the above-referenced '969 application. An improved mechanism for receiving and ejecting the cartridge from the loading chamber is disclosed, wherein the retention slot in the cartridge is engageable by the retention member upon partial insertion into the chamber and remains in engagement upon ejection to prevent the film cartridge from falling out. The user may complete the withdrawal of the cartridge by simply pulling the partially ejected cartridge out, overcoming the retention force.

Problems to be Solved by the Invention

In the prior art as described above, it is necessary for the user to fully insert the cartridge into the seated position where it is then mechanically locked. No provision is made for effecting a positive insertion of the film cartridge into the film loading chamber after the cartridge is partially inserted by the user.

SUMMARY OF THE INVENTION

It is therefor a principal object of the present invention to provide a seating mechanism that positively engages with the film cartridge to complete its insertion into a loading chamber upon partial manual insertion of the cartridge so that the cartridge is positively seated and the user is alerted to the seating action.

It is still a further object of the present invention to provide a loading chamber and a loading mechanism for end-wise receiving and positively loading a film cartridge initially inserted manually into the opening of the chamber.

It is yet a further object of the invention to provide an ejection mechanism operable in conjunction with the loading mechanism for partially ejecting a film cartridge from the loading chamber on opening of the chamber door.

In accordance with the invention, a camera is provided with a loading chamber for receiving a film cartridge of the type having positive engagement means formed therein and a combined insertion and ejection mechanism for engaging the positive engagement means for positively pulling the film cartridge in and seating it with an audible "click" sound to reassure the user that the film cartridge is loaded properly in the loading chamber.

In accordance with a first aspect of the invention, a camera for receiving a film cartridge of the type having positive engagement means formed therein comprises a loading chamber for receiving the film cartridge loaded manually through an end opening thereof, insertion means operable upon partial manual loading of the cartridge through the end opening for engaging the positive engagement means and for positively pulling and seating the film cartridge fully into the loading chamber with an audible sound to reassure the user that the film cartridge is loaded properly in the loading chamber, and ejection means for ejecting the cartridge from the loading chamber.

Preferably the ejection means further comprises first ejecting means for engaging an end of the film cartridge and partially moving it out the end opening of the loading chamber to an intermediate ejection position, and second ejecting means for engaging the film cartridge on approaching the intermediate ejection position and for moving the film cartridge completely out of the film loading chamber.

In accordance with a preferred embodiment of the invention, the insertion and second ejecting means preferably comprises a bell crank attached for pivotal movement with respect to the film cartridge loading chamber having insertion and ejection members projecting into the film loading chamber for selectively engaging the film cartridge notch and a drive end and an over center spring influencing the bell crank to pivot from insertion and ejection break over points or over center positions and into the seated and insertion positions, respectively.

The first ejecting means preferably comprises a door actuated lever and spring biased lifter acting on opening the door through a predetermined angle for partially ejecting the film cartridge and moving the bell crank from the seated position to the ejection break over point, whereupon the insertion member dis-engages the film cartridge engagement slot and the ejection member engages the drive end of the film cartridge and completes the ejection and release of the film cartridge as the bell crank moves under the influence of the over center spring into the insertion position.

Advantageous Effects of the Invention

Advantageously, the present invention allows the film cartridge to be positively seated with no effort by the user beyond initially inserting the film cartridge and tripping the release of the film cartridge engagement means. Then the bell crank mechanism takes over and end-wise loads the film cartridge and effects a positive seating, so that the door to the loading chamber may be closed. The door does not contact the film cartridge in order to insert and seat it and is not subject to damage by the user attempting to close the door with the cartridge extending through the opening.

The opening of the door effects partial ejection of the film cartridge which is then completed by the separate bell crank so that the cartridge is ejected further out of the door opening for ease of grasping the film cartridge. The film cartridge is only released after the door is opened to the predetermined position and an audible click alerts the user that the film cartridge is released and should not be dropped. The insertion and ejection method and apparatus thus provides positive user feed back and enhances the "feel" of quality of the camera.

BRIEF DESCRIPTION OF THE DRAWINGS

Other objects, advantages and features of the present invention will become apparent from the following specification when taken in conjunction with the accompanying drawings in which like elements are commonly enumerated and in which.

The drawings are schematic and not directed to any particular camera structure or film size.

DETAILED DESCRIPTION OF THE PREFERRED EMBODIMENT

The invention is disclosed as being embodied preferably in a still-picture camera employing a film cartridge, e.g. a 35 mm film cartridge. Because the features of this type of camera are generally well known, the description which follows is directed in particular to camera elements forming part of or cooperating directly with the preferred embodiment. It is to be understood, however, that other elements not shown or described may take various forms known to one of ordinary skill in the art.

Figure 1:
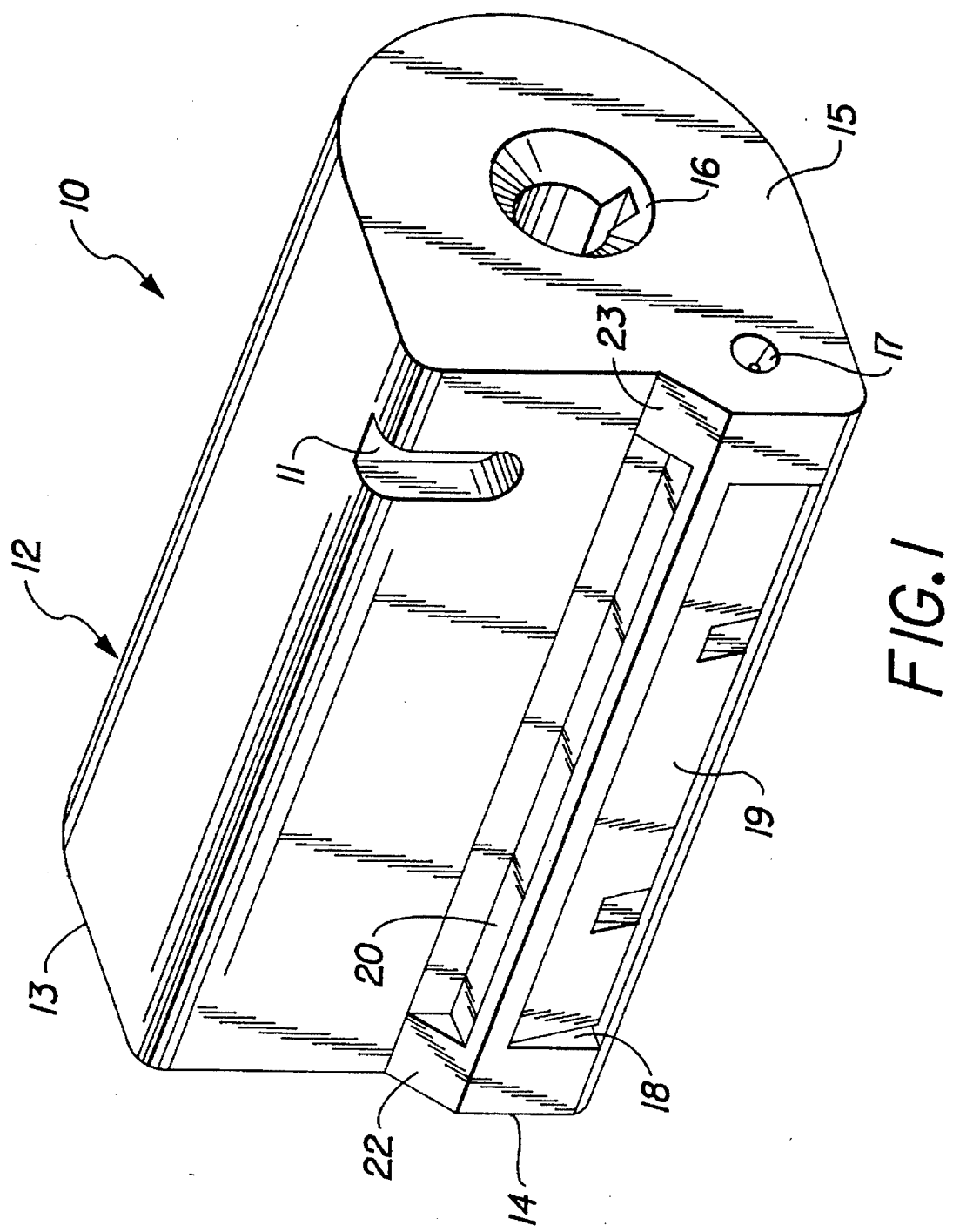
FIG. 1 is a perspective view of a film cartridge having an engagement notch.

Referring now to the drawings and first to FIG. 1, it depicts in perspective view a thrust type, film cartridge 10 containing a filmstrip wound on a spool (both within the opaque plastic or metal cartridge shell 12) attached to a core or hub 16 in a manner similar to the film cartridge or cassette disclosed in the above-referenced '914 patent. The filmstrip may be thrust out of the cartridge shell 12 by application of rotary motion to the cartridge spool 16 to thrust its leading end through the light trapping opening in cartridge snout 14.

A retention slot 20 is depicted formed in the inner surface of cartridge snout 14 extending longitudinally between portions 22 and 23 of respective ends of cartridge snout 14 and cartridge shell 12. The retention slot 20 may or may not be present in the cartridge shell 12 for the loading and ejecting mechanism of the present invention. If present, it may be employed as a retention slot for cooperation with a spring loaded retention member of the type described in the above referenced '969 patent for preventing the cartridge 10 from falling out of or being forcibly ejected completely from the loading chamber 26 upon its ejection from the seated position in the manner described below. In accordance with the present invention, the cartridge shell 12 is formed with a positive engagement notch 11 for cooperation with the mechanism for inserting and ejecting the cartridge 10 from the loading chamber in the manner described hereafter.

The door drive interface 17 is intended to be engaged by a door opening driver (not shown) of the camera that extends into the loading chamber of the camera body to effect the opening of a door 19 over the opening 18 when the filmstrip is to be thrust out of or rewound back into the cartridge 10.

The cartridge 10 is intended to be inserted end-wise into a loading chamber of a camera body through an open hinged door in the base of the camera body as generally depicted in FIGS. 14 and 15 of the '914 patent. It should be noted that the '914 patent does not disclose any notch 11 or engagement retention slot 20 in the cartridge 10, and the door, loading and ejecting mechanism is constructed and functions differently than the door, loading and ejecting apparatus and method of operation of the present invention.

Figure 2:
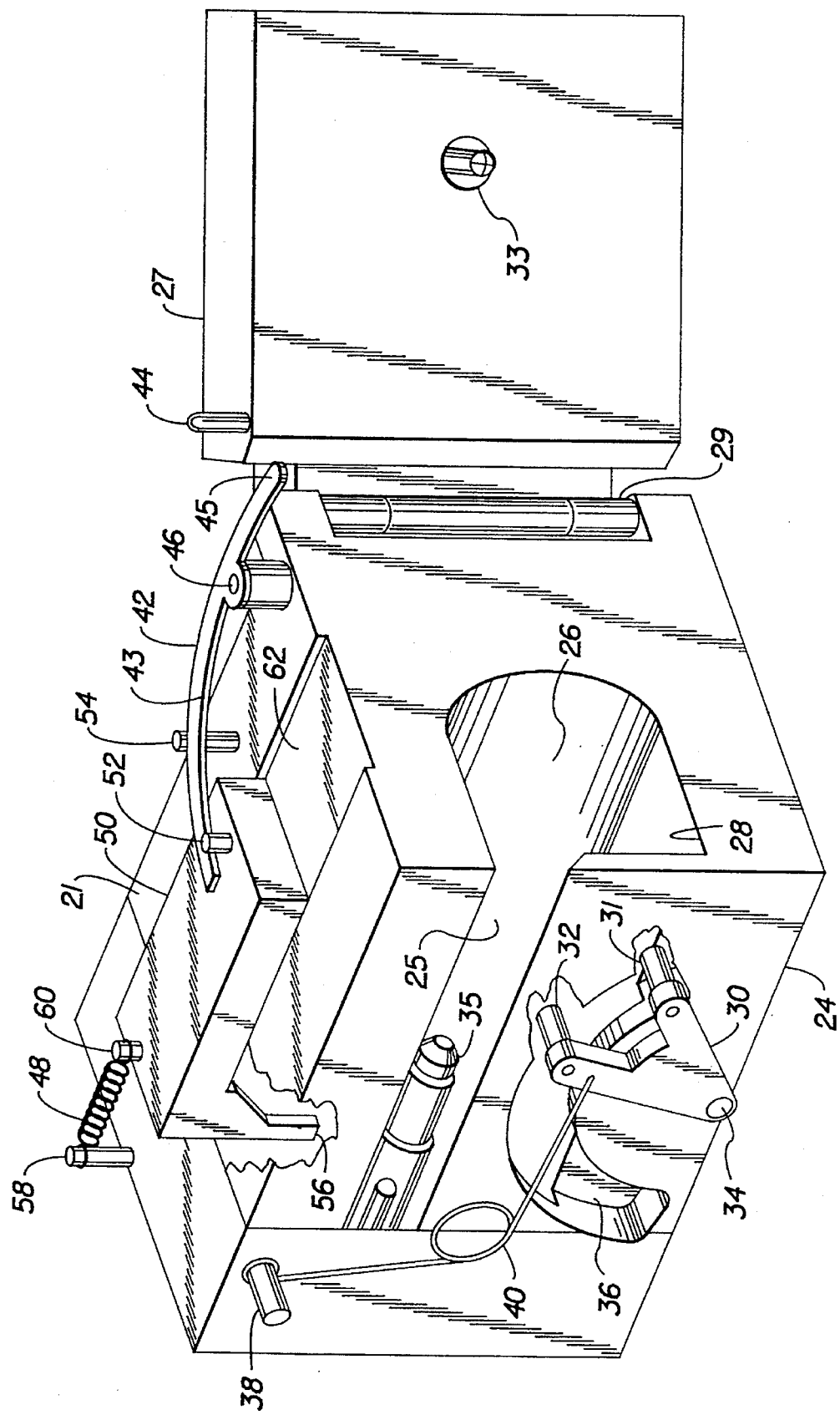
FIG. 2 is a perspective, partially sectioned view of the components of the positive film cartridge loading and ejecting apparatus of the invention in the initial insertion position for receiving a film cartridge in the loading chamber of the camera body.

Turning to FIG. 2, it is a perspective exploded view of the components of the positive film cartridge loading and ejecting apparatus of the invention in the initial, unloaded, insertion position for receiving a film cartridge 10 in the loading chamber 26 of the portion of the camera body 24. A door 27 pivots on hinges 29 from the fully open, 135° position depicted to a fully closed position in a manner shown in FIGS. 8 and 9 to seal the end opening 28 to the loading chamber 26. When closed, the centering chuck 33 engages the cartridge spool 16 to center it. The other end of the cartridge spool 16 is fitted over the motorized drive axle 35 which is attached to a drive motor (not shown) and rotated to thrust out and rewind the filmstrip in the cartridge 10. The cartridge snout 14 and opening 18 of the film cartridge 10 are aligned to the elongated side opening 25 in the portion of the camera body 24. The side opening 25 is aligned to the film path in the camera body (not shown) so that the leading end of the film may be automatically transported through the camera exposure gate and onto a camera take-up spool in a manner well known in the prior art.

Figure 6:
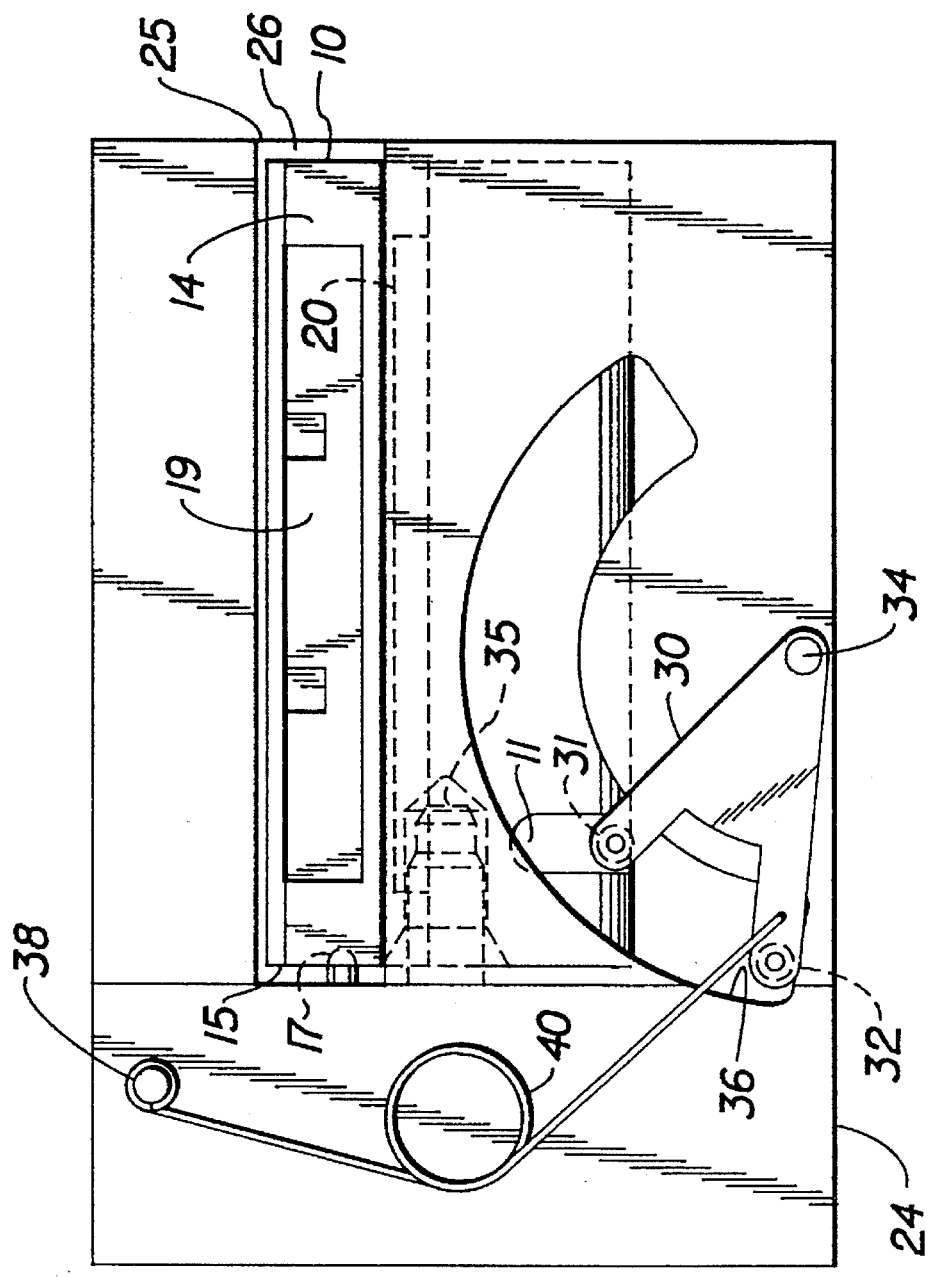

FIG. 2 also depicts the bell crank 30 having insertion and ejection members 31 and 32 each comprising crank legs and rods that project outward from pivot point 34 and then into the loading chamber 26 through an arcuate opening track 36. The bell crank is pivotally attached at pivot point 34 to the portion of the camera body 24 so that it can pivot between the insertion position depicted in FIGS. 2 and 3 and the seated position depicted, for example, in FIGS. 6 and 7. The crank leg of the second member 32 is attached to one end of over center spring 40. The other end of over center spring 40 is attached to the portion of camera body 24 at post 38.

The bell crank 30 and over center spring 40 operate to positively pull the film cartridge 10 into the loading chamber 26 during loading and to positively eject the cartridge 10 from the loading chamber 26 during ejection in conjunction with a first ejector mechanism also depicted in FIG. 2. The ejector mechanism includes the sliding ejector 50 in cooperation with the pivoting lever 42, the biasing spring 48 and the spring loaded boss 44 in door 27. As described further below, opening the door 27 causes the boss 44 to pivot lever 42 on its pivot point 46, and lever 42 slides ejector 50 against the tension of spring 48 to partially eject the film cartridge 10 and to move bell crank 30 from the seated position to the over center position, whereupon the bell crank 30 moves into the insertion position and completes the ejection. In all other operations, the ejector mechanism, and particularly the ejection lever 42 and ejector 50, are in the position depicted in FIG. 2.

The ejection lever 42 has a first lever arm 43 that bears against post 52 on ejector 50 and a second lever arm 45 that extends outward over a side of door 27 to engage the spring loaded detent or boss 44. First lever arm 43 also is restrained from moving clockwise by post 54 fixedly projecting from the surface 21 of the portion of camera body 24. Spring loaded pin or boss 44 is normally extended as shown in FIG. 2 to make contact with the second lever arm 45 and is able to move lever 42 counterclockwise against the force of coil spring 48 when door 27 is opened. However, when door 27 is closed from the position depicted in FIG. 2, the spring loaded boss 44 is unable to move lever arm against the restraint of post 54 acting on first lever arm 43. The spring load force that extends pin or boss 44 outward from door 27 is overcome by the resistance of post 54, and boss 44 retracts into the door 27 so that its free end passes under the second lever arm 45. Second lever arm 45 has a ramped edge on its lower surface to encourage retraction of boss 44 as it passes under second lever arm 45.

Ejector 50 is attached at post 60 to one end of coil spring 48 which is attached to post 58 projecting from surface 21 at its other end. Ejector 50 is movable in a sliding track 62 formed in surface 21 in an ejecting direction, under the force applied by lever arm 43 during opening of door 27, and in a seating or loading direction, under the force applied by spring 48. An ejector tab 56 extends from ejector 50 and through an elongated slot into the loading chamber 26 to engage the cartridge driving end 15 when a cartridge 10 is loaded. Ejector tab 56 thus applies the ejecting force to the film cartridge 10 during its initial ejection phase effected by opening the door 27.

Turning to FIGS. 3–6, the film cartridge 10 is depicted in relation a to the schematically illustrated portion of a camera body 24 having the elongated loading chamber 26 configured to receive the elongated cartridge 10 and orient the cartridge snout 14 and opening 18 outward and aligned to elongated side opening 25. FIGS. 3–6 illustrate the movement of certain of the above described components, as well as the operation of those components, for drawing in and completing the insertion and positive seating of the cartridge 10 into the loading chamber 26. The door 27 and its components as well as lever 42, are not illustrated in FIGS. 3–6.

Figure 3:
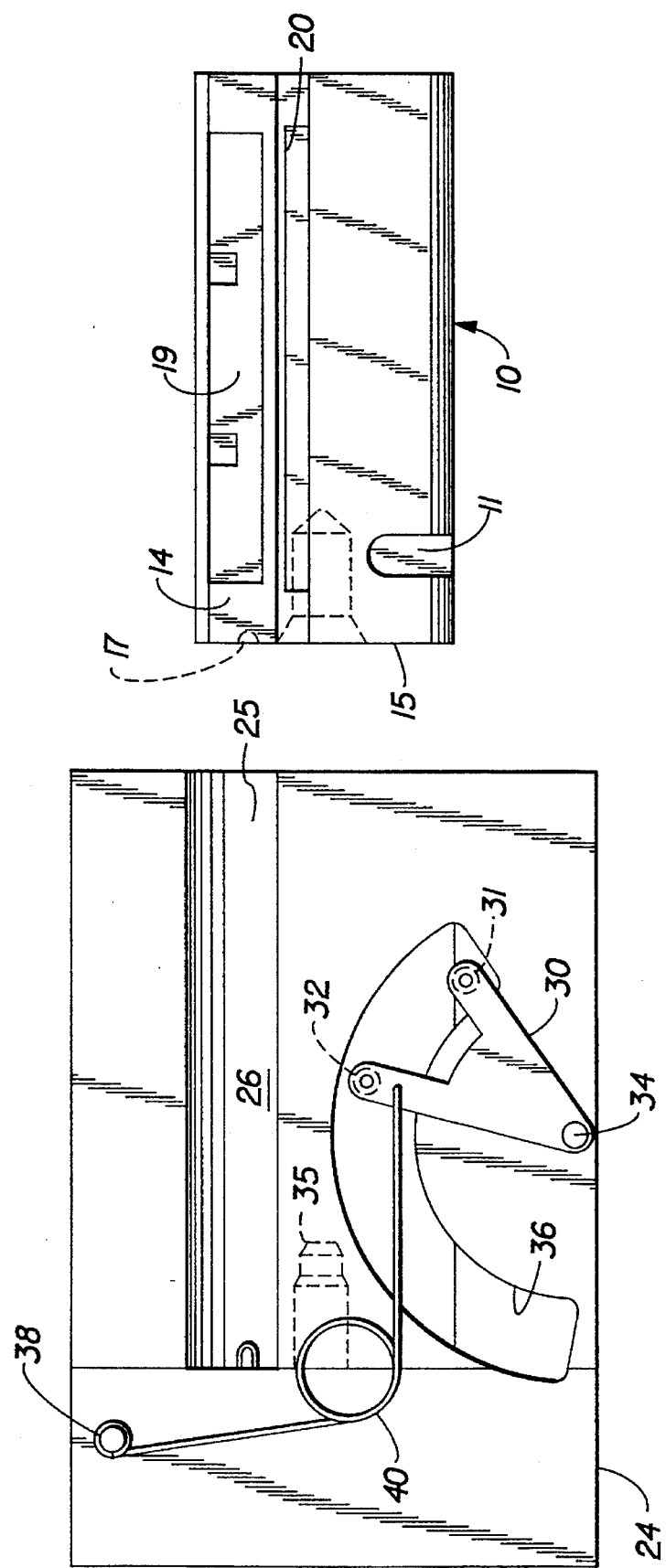
FIGS. 3–6 depict in side views the successive steps of insertion and seating of the film cartridge into the loading chamber through the engagement of a bell crank with the engagement notch of the film cartridge and application of seating force by an over center spring as the bell crank moves from an insertion position, through the over center position and into a seated position.
Figure 4:
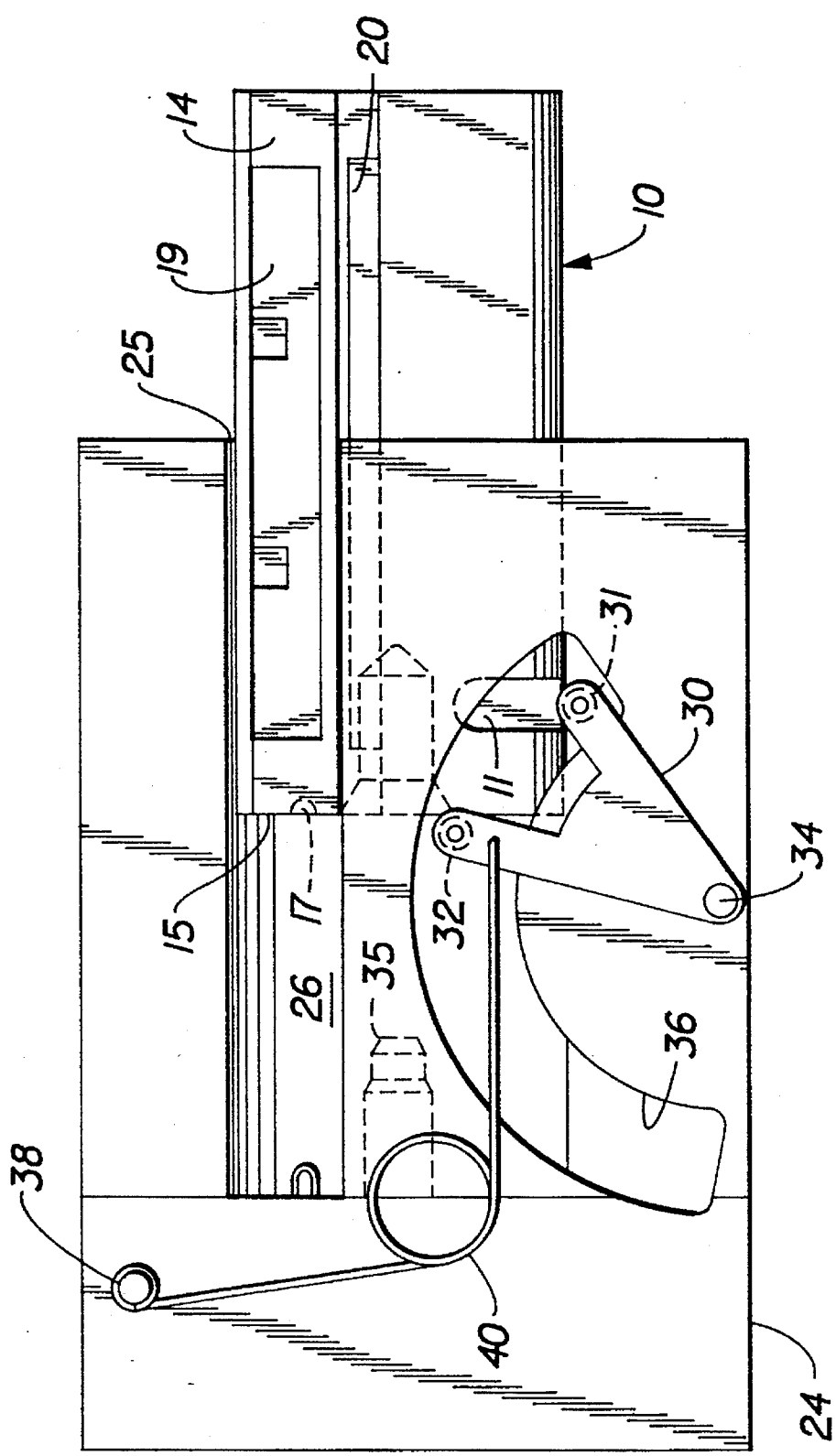

In FIGS. 3 and 4, the cartridge 10 is shown entering the opening of the chamber 26 which is effected after the chamber door (not shown) is opened to the position depicted in FIG. 2, and the cartridge 10 is manually oriented and moved end-wise through the opening. The rear drive end 15 of film cartridge 10 bears against the rod of the ejection member 32. The rod of the insertion member 31 extends into the loading chamber 26 and into engagement notch 11 in film cartridge 10 in the cartridge engage position depicted in FIG. 4. Bell crank over center spring 40 applies tension to maintain the bell crank 30 in the insertion position depicted in FIGS. 2–4 and to resist pivotal movement of the bell crank 30 in the loading direction.

Figure 5:
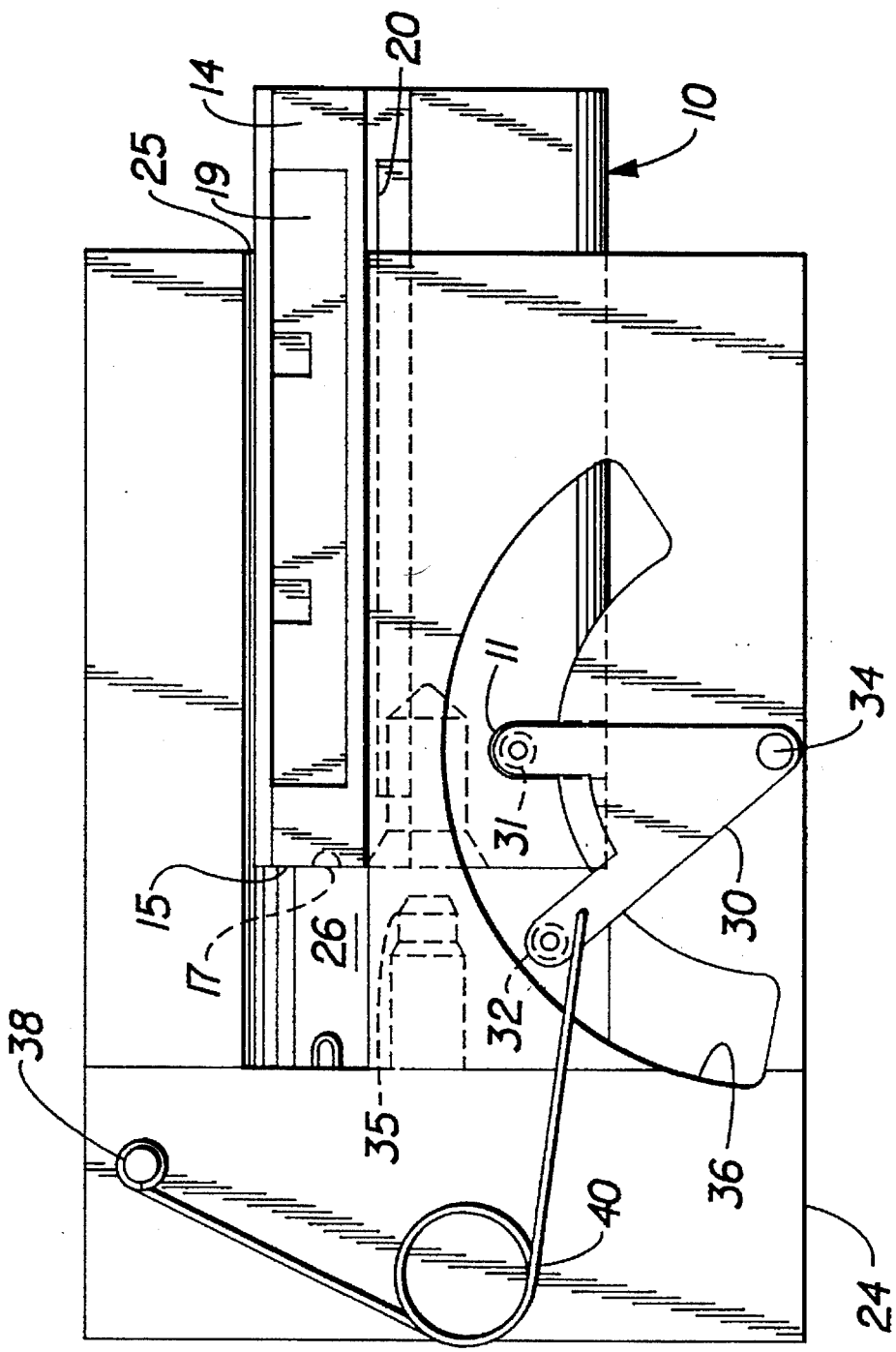

Continued manual loading of the film cartridge 10 by the user causes the bell crank 30 to rotate counter-clockwise, increasing tension on over center spring 40 as the bell crank approaches the insertion over center position of FIG. 5. When that position is reached and passed, the rod of bell crank ejection member 32 dis-engages from the rear drive end of film cartridge 10, the rod of insertion member 31 is fully seated in notch 11, and over center spring 40 vigorously drives bell crank 30 counterclockwise into the seated position of FIG. 6. The cartridge spool 16 of film cartridge 10 is seated on motor drive axle 35 with an audible dick that signals seating to the user and that the door 27 may be closed.

Figure 7:
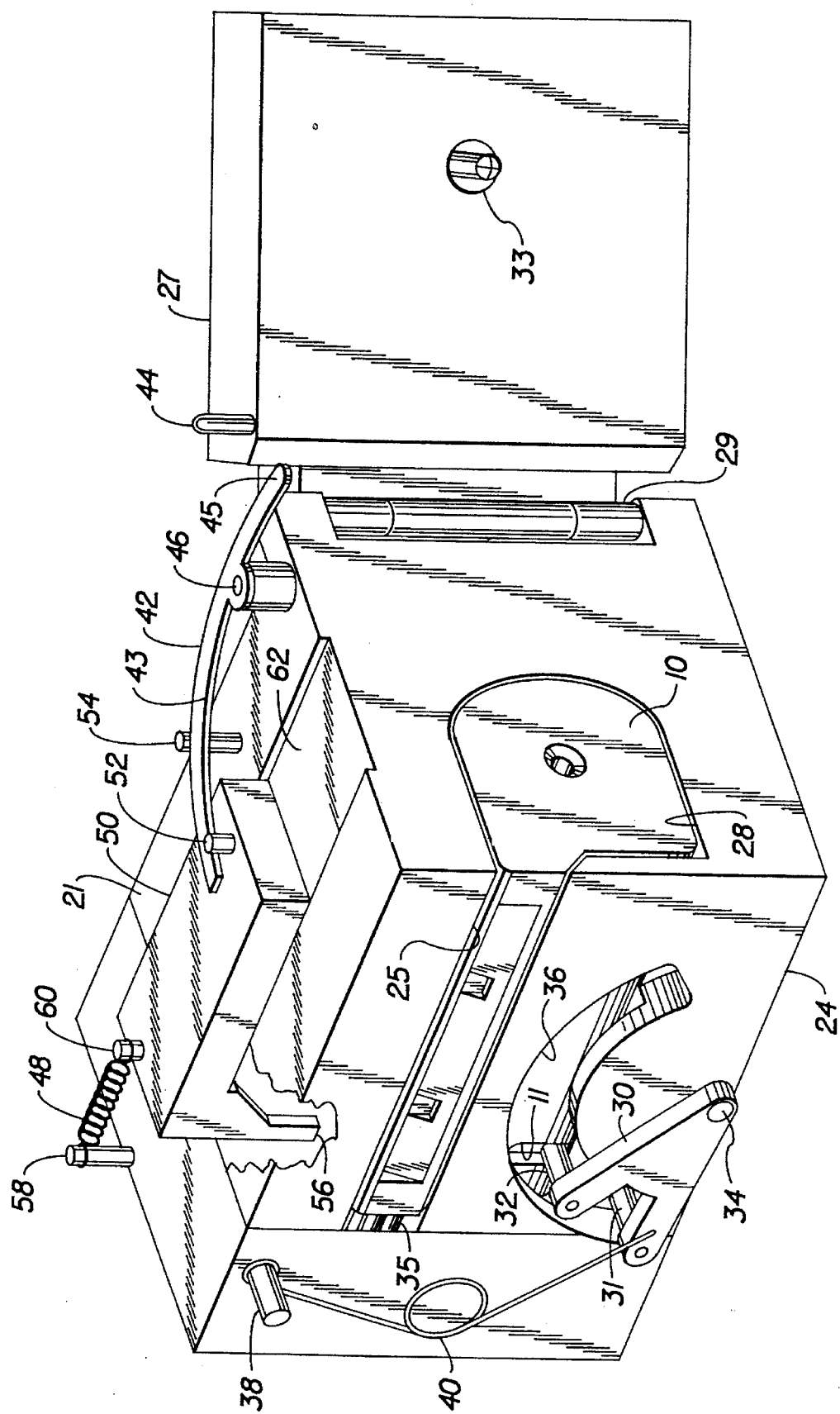
FIGS. 7–9 are perspective, partially sectioned views of the successive door closing positions after a film cartridge is inserted into the loading chamber in accordance with FIGS. 3–6.
Figure 8:
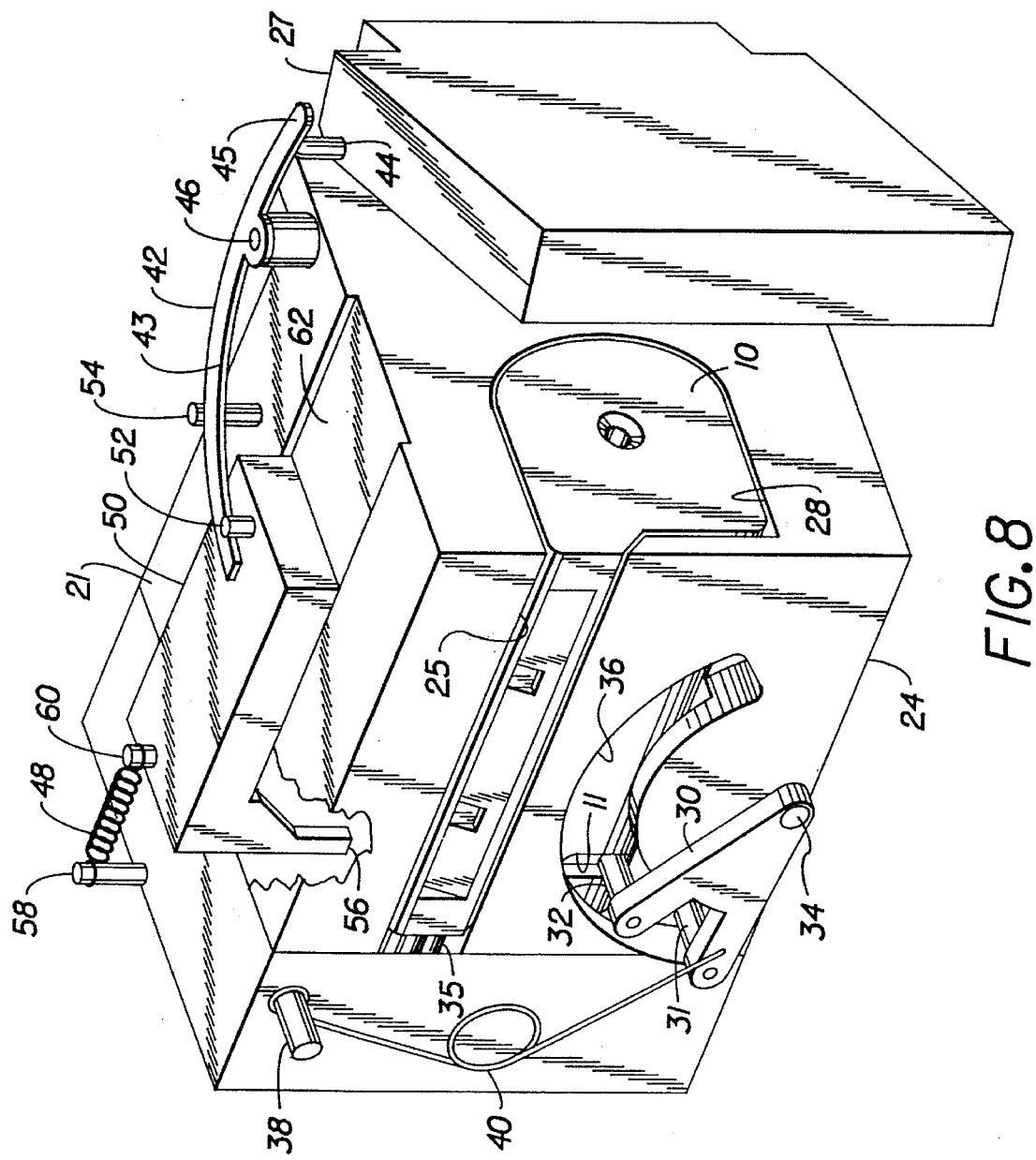

FIG. 7 depicts the cartridge 10 seated within the loading chamber 26 with the door 27 still open. FIG. 8 depicts the spring loaded boss 44 being depressed while it passes under the second ejection lever arm 45 as the door 27 is closed.

Figure 9:
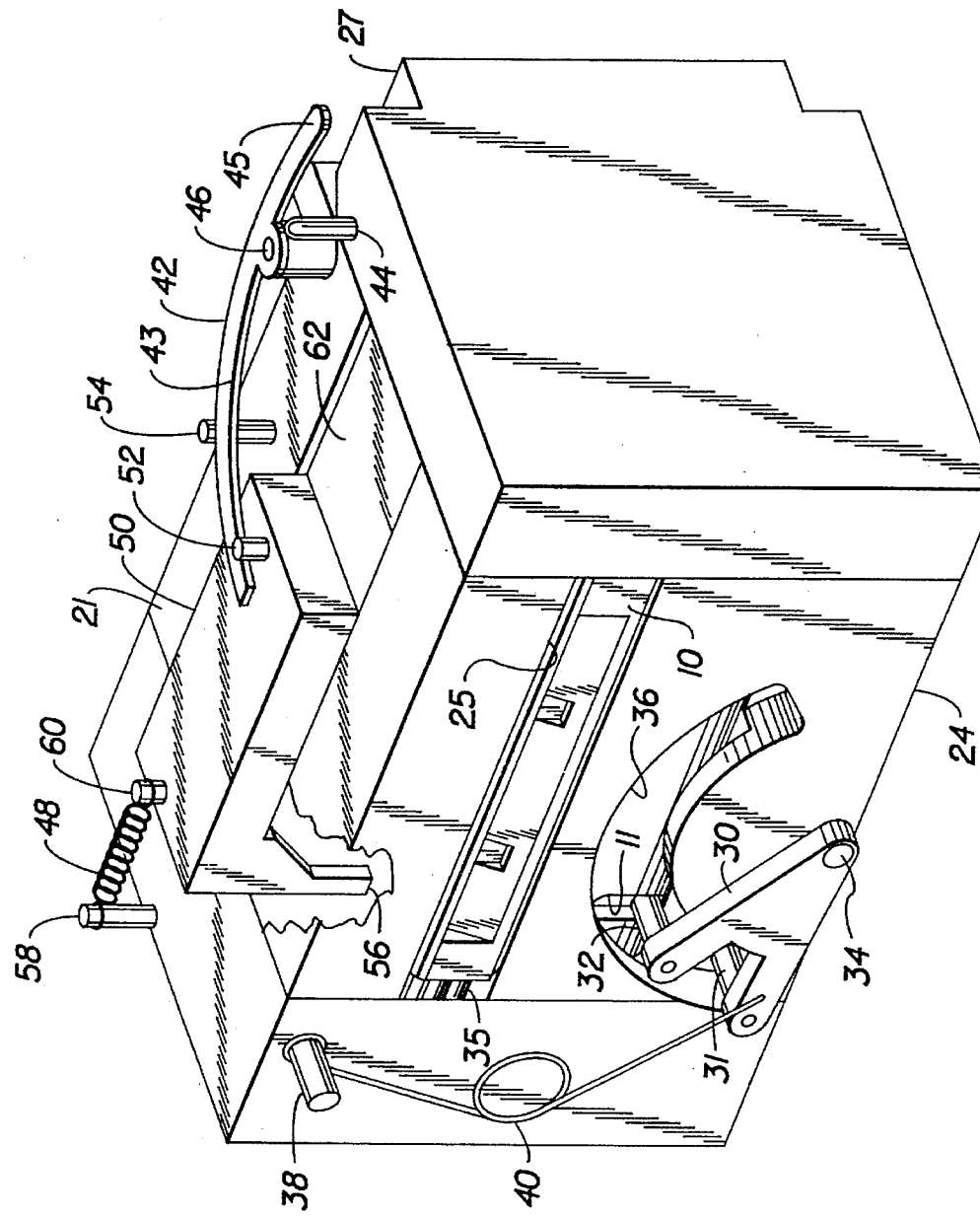

FIG. 9 depicts the door 27 closed and spring loaded boss 44 again projecting outward, but on the opposite side of the second ejection lever arm 45. In this loaded position, the filmstrip in the film cartridge 10 may be thrust out a frame at a time, exposed in the camera exposure gate and wound onto the camera take-up cartridge until all image frames are exposed. The camera drive motor to drive axle 35 may then be reversed to rewind the filmstrip into the cartridge 10 after all exposures are made, all in a manner well known in the camera art.

In order to eject the film cartridge 10 from the loading chamber, it is only necessary to open the door 27 from the position of FIG. 9. during opening, the spring loaded boss 44 bears against the second ejection lever arm 45 and pivots ejection lever 42 counter-clockwise. In that process, ejector 50 is slidably moved on track 62 against the tension of spring 48 and acts as a lifter lifting the lifter arm or ejector tab 56. The ejector tab 56 pulls the film cartridge 10 outward, and engagement notch 11 engages the rod of insertion member 31 to rotate bell crank 30 clockwise. As bell crank 30 rotates, it reaches the ejection over center position (which is close to the position illustrated in FIG. 5). Then, the over center force of over center spring 40 takes command, and bell crank 30 rapidly rotates back to the insertion position. In that movement in the ejecting direction, the rod of insertion member 31 dis-engages from notch 11 and the rod of ejection member 32 bears against the drive end of the film cartridge to forcibly eject the film cartridge 10 out of loading chamber 26.

Figure 10:
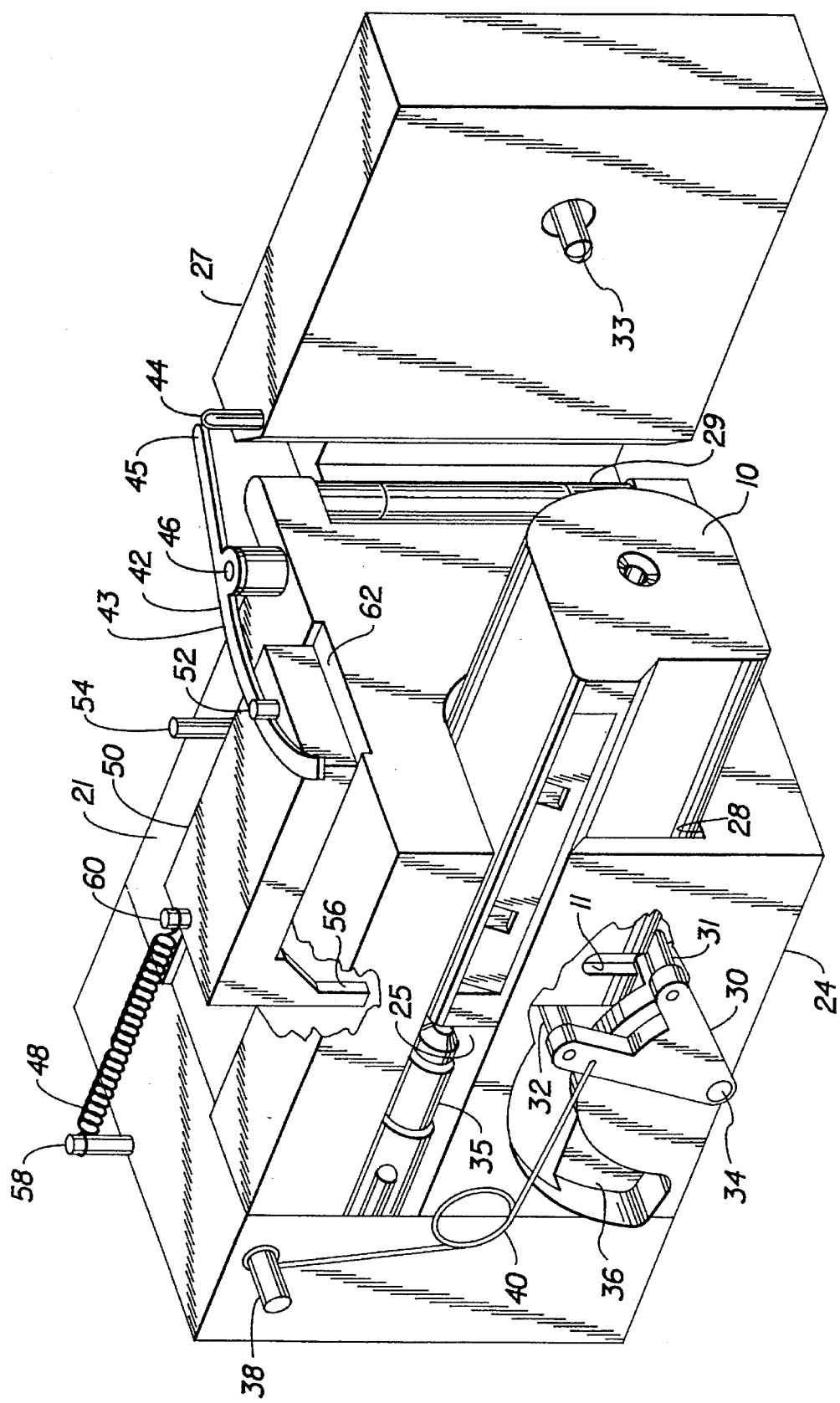
FIG. 10 is a perspective, partial section view depicting the manner of release and ejection of the film cartridge from the loading chamber.

At the same time, the spring loaded boss 44 rides along and around the tip of the second ejection lever arm 45 to the full open position depicted in FIG. 10. At that point depicted in FIG. 10, the bell crank 30 has rotated back to the insertion position, and the ejector 50 is at the fully extended position. Further opening of the door moves the spring loaded boss 44 past the tip of the second ejection lever arm 45. When that occurs, the ejector 50 and ejector lever 42 move back to the position depicted in FIG. 2 under the return force of spring 48. The bell crank 30 remains in the insertion position of FIG. 2 ready for accepting a new film cartridge 10. If none is to be inserted at the time, the door may be closed and re-opened later without changing the insertion position of the bell crank 30.

In this fashion, the present invention allows the film cartridge to be positively seated with no effort by the user beyond initially inserting the film cartridge and tripping the over center motion of the bell crank to effect a positive seating, so that the door to the loading chamber may be closed. The opening of the door effects partial ejection of the film cartridge by the ejection mechanism, which is then completed by the over rotation of the bell crank, so that the cartridge is ejected further out of the door opening for ease of grasping the film cartridge. As mentioned above, a further retention mechanism may be employed for engaging retention slot 20 to avoid forcible ejection of the cartridge.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–10

10 film cartridge
11 positive engagement notch
12 cartridge shell
13 drive end
14 cartridge snout
15 rear drive end
16 cartridge spool
17 door drive interface
18 opening
19 film cartridge door
20 retention slot
21 surface
22 portion of cartridge snout 14 at end 13
23 portion of cartridge snout 14 at end 15
24 portion of camera body
25 elongated side opening
26 loading chamber
27 loading chamber door
29 door hinge
30 bell crank
31 insertion member including crank leg and rod
32 ejection member including crank leg and rod
33 centering axle
34 pivot point
35 drive axle
36 arcuate track
38 post
40 over center spring
42 ejection lever
43 first ejection lever arm
44 spring loaded boss
45 second ejection lever arm
46 pivot point
48 coil spring
50 lifter or ejector
52 post
54 post
56 ejector tab or lift arm
58 post
60 post
62 sliding track

What is claimed is:

1. A camera for receiving a film cartridge of the type having positive engagement means formed therein comprising:

a loading chamber for receiving the film cartridge loaded manually through an end opening thereof;

insertion means operable upon partial manual loading of the cartridge through said end opening for engaging said positive engagement means and for positively pulling and seating said film cartridge fully into said loading chamber with an audible sound to reassure the user that said film cartridge is loaded properly in said loading chamber; and ejection means for ejecting said cartridge from said loading chamber.

2. The camera of claim 1 wherein said ejection means further comprises:

first ejecting means for engaging an end of said film cartridge and partially moving it out said end opening of said loading chamber to an intermediate ejection position; and second ejecting means for engaging said film cartridge on approaching said intermediate ejection position and for moving said film cartridge completely out of said loading chamber.

3. The camera of claim 1 further comprising:

a door movable between a closed position covering said end opening and an open position allowing film cartridge insertion and ejection; and wherein said ejection means further comprises:

first ejecting means operable in response to the opening of said door for engaging an end of said film cartridge and partially moving it out said end opening of said loading chamber to a partial ejection position when said door is moved open sufficiently to clear said end opening for ejection of said cartridge; and second ejecting means for engaging said film cartridge on approaching said intermediate ejection position and for moving said film cartridge completely out of said loading chamber.

4. The camera of claim 1 further comprising:

a door movable between a closed position covering said end opening and an open position allowing film cartridge insertion and ejection;

a door operated ejector for ejecting said film cartridge from said seated position in response to the opening of said door, said ejector engaging the seated end of said film cartridge and partially moving said film cartridge out said end opening of said loading chamber to a partial ejection position when said door is moved open sufficiently to clear said end opening for complete ejection of said cartridge; and means for engaging said film cartridge on approaching said partial ejection position and for moving said film cartridge completely out of said loading chamber.

5. The camera of claim 1 wherein said film cartridge further comprises an elongated cartridge shell for retaining a photographic filmstrip and said positive engagement means further comprises a notch formed in said cartridge shell along the length thereof.

6. A camera for receiving an elongated film cartridge having a drive end and having a positive engagement notch formed therein comprising:

an elongated loading chamber in the camera body having an end opening for receiving said elongated film cartridge loaded manually through said end opening;

a bell crank attached for pivotal movement with respect to said film cartridge loading chamber in a loading direction between an insertion position and through an insertion over center position upon contact with a manually loaded film cartridge and into a seated position;

an over center spring coupled between said bell crank and a fixed point, said over center spring resisting movement of said bell crank from said insertion position and influencing movement of said bell crank from said insertion over center position into said seated position; and an insertion member coupled to said bell crank and extending into said loading chamber, said insertion member engageable with said film cartridge engagement notch in said over center position for positively loading and seating said film cartridge upon pivotal movement of said bell crank in said loading direction under the influence of said over center spring, said bell crank further including an ejection member extending into said loading chamber in said insertion position of said bell crank for engaging said drive end of said film cartridge inserted through said opening of said film loading chamber and for pivoting said bell crank and engaging said insertion member into said engageable notch as said film cartridge is advanced manually in the loading direction, whereby said bell crank is pivoted into said insertion over center position from which said over center spring urges said bell crank into said seated position.

7. The camera of claim 6 further comprising:

means for partially ejecting said film cartridge from its seated position in said loading chamber and toward said end opening and for pivoting said bell crank, through the engagement of said insertion member in said engageable notch during movement of said film cartridge, into an ejection over center position, from which said over center spring pivotally urges said bell crank into said insertion position as said bell crank pivots said insertion member from engagement with said engagement notch and said ejection member against said drive end to positively eject said film cartridge from said loading chamber.

8. The camera of claim 1 further comprising:

a door movable between a closed position covering said end opening and an open position allowing film cartridge insertion and ejection; and wherein said partial ejecting means further comprises:

a door operated ejector for ejecting said film cartridge from said seated position in response to the opening of said door through a predetermined opening angle, said ejector engaging the seated drive end of said film cartridge and partially moving said film cartridge out said end opening of said loading chamber to a partial ejection position when said door is moved open sufficiently to clear said end opening for complete ejection of said cartridge.

9. The camera of claim 8 wherein said door operated ejector further comprises:

a pivotal lever pivoted on opening said door through a predetermined angle; and a spring biased lifter having a lift arm projecting into said loading chamber adjacent said drive end of said cartridge and movable along said loading chamber, said lifter positioned to be engaged by said lever and moved along said loading chamber upon pivotal movement of said lever by said door for partially ejecting said film cartridge and moving said bell crank, through engagement of said insertion member with said film cartridge engagement notch, from said seated position to said ejection over center position, whereupon said bell crank moves to said insertion position and completes the ejection and release of said film cartridge under the influence of said over center spring.

10. The camera of claim 7 wherein said insertion and ejection members further comprise:

an insertion crank leg and rod extending into said loading chamber for engaging said engageable notch during pivotal movement thereof in the loading directions between said insertion over center position and said seated position and in the ejecting direction between said seated position and said ejection over center position; and an ejection crank leg and rod spaced from said insertion crank leg and rod and extending into said loading chamber to engage the drive end of said film cartridge inserted through said end opening during manual loading thereof into said film loading chamber in order to pivot said bell crank to the insertion over center position and insert said insertion crank rod into said engagable notch as said film cartridge is inserted manually in the loading direction and to engage said drive end of said film cartridge upon pivotal movement of said bell crank into said ejection over center position and during movement in the ejecting direction into said insertion position to positively eject said film cartridge from said loading chamber.

11. The camera of claim 10 further comprising:

means for partially ejecting said film cartridge from its seated position in said loading chamber and toward said end opening and for pivoting said bell crank, through the engagement of said insertion rod in said engageable notch during movement of said film cartridge, into an ejection over center position, from which said over center spring pivotally urges said bell crank into said insertion position as said bell crank pivots said insertion rod from engagement with said engagement notch and said ejection rod against said drive end to positively eject said film cartridge from said loading chamber.

12. The camera of claim 11 further comprising:

a door movable between a closed position covering said end opening and an open position allowing film cartridge insertion and ejection; and wherein said partial ejecting means further comprises:

a door operated ejector for ejecting said film cartridge from said seated position in response to the opening of said door through a predetermined opening angle, said ejector engaging the seated drive end of said film cartridge and partially moving said film cartridge out said end opening of said loading chamber to a partial ejection position when said door is opened sufficiently to clear said end opening for complete ejection of said cartridge.

13. The camera of claim 12 wherein said door operated ejector further comprises:

a pivotal lever pivoted on opening said door through a predetermined angle; and a spring biased lifter having a lift arm projecting into said loading chamber adjacent said drive end of said cartridge and movable along said loading chamber, said lifter positioned to be engaged by said lever and moved along said loading chamber upon pivotal movement of said lever by said door for partially ejecting said film cartridge and moving said bell crank, through engagement of said insertion rod with said film cartridge engagement notch, from said seated position to said ejection over center position, whereupon said bell crank moves to said insertion position and completes the ejection and release of said film cartridge under the influence of said over center spring through engagement of said ejection rod against said film cartridge drive end.

\* \* \* \* \*

UNITED STATES PATENT AND TRADEMARK OFFICE
CERTIFICATE OF CORRECTION

PATENT NO. : 5,477,295
DATED : December 19, 1995
INVENTOR(S) : Joel S. Lawther, et al It is certified that error appears in the above-indentified patent and that said Letters Patent is hereby corrected as shown below:

Column 10, line 9, Claim 8, The camera of claim "1" should read The camera of claim --7--.

Column 10, line 40, Claim 10, The camera of claim "7" should read The camera of claim --6--.

Signed and Sealed this

Twenty-fifth Day of June, 1996

Attest:

BRUCE LEHMAN

*Attesting Officer*     *Commissioner of Patents and Trademarks*